May 23, 1967  J. L. BEACH  3,321,068

THERMOMETER SET

Filed Oct. 22, 1965

INVENTOR.
Janet L. Beach his attorneys

United States Patent Office 3,321,068
Patented May 23, 1967

3,321,068
THERMOMETER SET
Janet L. Beach, % Clinical Products Inc., 318 Freeport Road, Pittsburgh, Pa. 15238
Filed Oct. 22, 1965, Ser. No. 501,787
3 Claims. (Cl. 206—16.6)

ABSTRACT OF THE DISCLOSURE

A thermometer set comprising a clinical thermometer, a receptacle for the thermometer adapted to hold the thermometer in generally upright position, the receptacle having adhesive attaching means for securing the receptacle to a generally upright surface, said means being appliable on said surface and removable therefrom for cleansing of the surface. An adhesive strip is adapted to be applied to a generally upright surface to which the receptacle is to be fastened and removable therefrom for cleansing the surface, the receptacle having a portion through which the receptacle is adapted to be supported, the adhesive strip and said portion of the receptacle having cooperating surface portions one of which has very small loops and the other of which has elements which substantially hook into such loops when such surface portions are pressed together, which loops and elements separate when such surface portions are pulled apart ("Velcro" fastener). The receptacle for the thermometer may comprise an elongated body portion of less length than the thermometer having an open upper end and a closed lower end, the receptacle also comprising a cap portion appliable to the open upper end of the body portion to close such upper end except that the cap portion has therethrough an opening of sufficient size to receive the thermometer so that the thermometer may be introduced and withdrawn through the opening in the cap portion and will have its upper end projecting through the opening and above the top of the cap portion when the thermometer is disposed in the receptacle, the body portion of the receptacle having attaching means for securing the receptacle to a generally upright surface, said means being appliable on the surface and removable therefrom for cleansing of the surface.

---

This invention relates to a thermometer set comprising a clinical thermometer and a receptacle for the thermometer especially designed and adapted so that each patiet in a hospital may have his own personal thermometer with a receptacle therefor suitably mounted and disposed within easy reach.

The custom in hospitals is for a nurse to make the rounds taking temperatures carrying a tray with a number of thermometers each in a receptacle or compartment. There is no assurance that the same thermometer will be used for any patient on successive rounds and generally no attempt is made to allocate the thermometers to particular patients. Great care has to be exercised to insure that all of the thermometers are disinfected before each use and altogether the procedure employed is unsatisfactory and time wasting.

I provide for each patient to have his own thermometer which remains adjacent to the patient's bed within easy reach. While means may be and preferably are provided for disinfecting the thermometer after each use this has less importance than when the same thermometer is apt to be used by a different patient on each round, especially when patients may have communicable diseases. I provide means for easily and securely supporting, preferably by fastening to a generally upright surface, the receptacle for the thermometer. The receptacle may be removed for cleaning and replaced. The receptacle is so designed and proportioned that it protects the portion of the thermometer which enters the patient's mouth while the extreme end of the thermometer opposite the end which enters the patient's mouth projects out of the top of the receptacle facilitating handling of the thermometer and insertion and withdrawal thereof into and from the receptacle.

I provide a thermometer set comprising a clinical thermometer and a receptacle for the thermometer, the receptacle comprising an elongated body portion of less length than the thermometer having an open upper end and a closed lower end, the receptacle also comprising a cap portion appliable to the open upper end of the body portion to close such upper end except that the cap portion has therethrough an opening of sufficient size to receive the thermometer so that the thermometer may be introduced and withdrawn through the opening in the cap portion and will have its upper end projecting through the opening and above the top of the cap portion when the thermometer is disposed in the receptacle. The body portion of the receptacle has means, preferably including adhesive means, for attaching the receptacle to a generally upright surface. Desirably fastening means having cooperating surface portions which have very small mechanical interlocking elements which interlock when such portions are pressed together and separate when such portions are pulled apart are provided for attaching the receptacle to a supporting surface.

I further provide a thermometer set comprising a clinical thermometer, a receptacle for the thermometer and an adhesive strip adapted to be applied to a generally upright surface to which the receptacle is to be fastened, the receptacle having a portion through which the receptacle is adapted to be supported, the adhesive strip and said portion of the receptacle having cooperating surface portions which have very small mechanically interlocking elements which interlock when such surface portions are pressed together and separate when such surface portions are pulled apart.

I provide a supporting member, desirably in the form of an adhesive strip although it may take other forms, adapted to be applied to a generally upright surface to which the receptacle is to be fastened, the receptacle having a portion through which the receptacle is adapted to be supported, the supporting member and said portion of the receptacle having cooperating surface portions which have very small mechanically interlocking elements which interlock when such surface portions are pressed together and separate when such surface portions are pulled apart. One of the cooperating surface portions may have very small loops and the other may have elements which substantially hook into such loops when the surface portions are pressed together, the loops and elements separating when the surface portions are pulled apart.

Other details, objects and advantages of the invention will become apparent as the following description of a present preferred embodiment thereof proceeds.

In the accompanying drawings I have shown a present preferred embodiment of the invention in which FIGURE 1 is an isometric view of my thermometer set applied to a generally upright surface;

Figure 1:
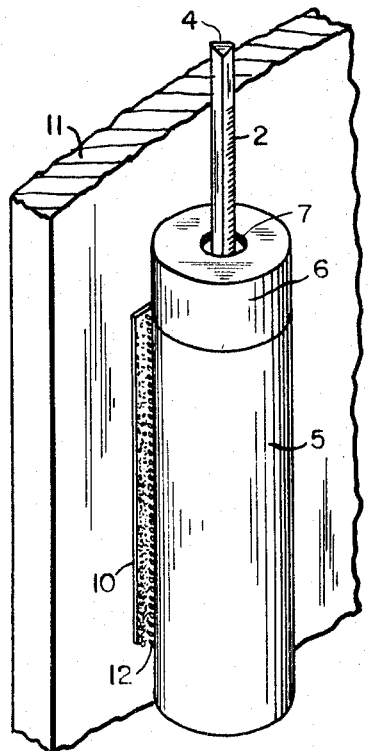
Figure 2:
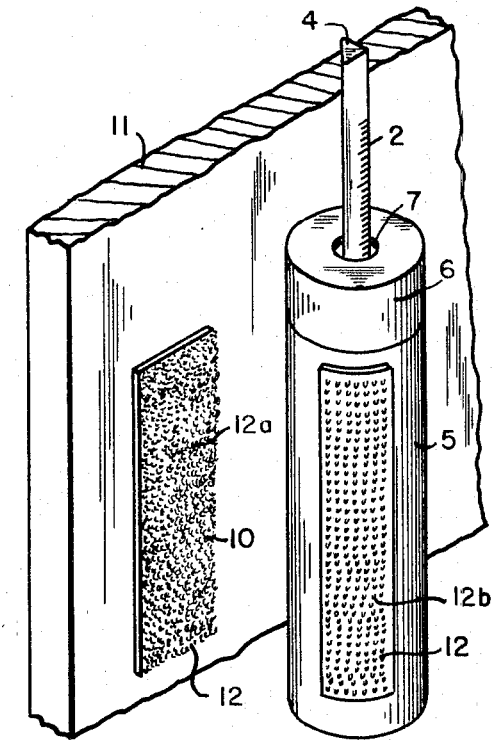
FIGURE 2 is a view similar to FIGURE 1 but showing the receptacle separated from the supporting member and turned through an angle to show the part of the receptacle which cooperates with the supporting member.
Figure 4:
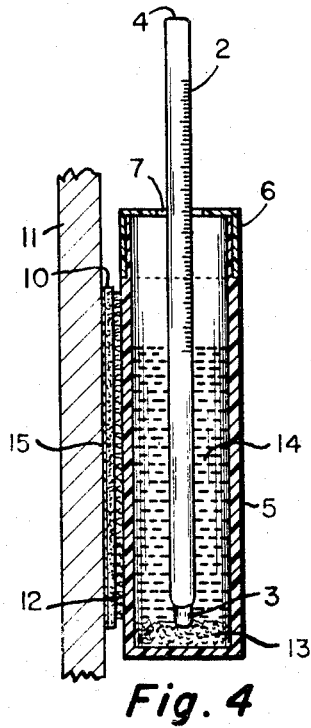
FIGURE 4 is a vertical cross-sectional view through the structure shown in FIGURE 1.
Figure 3:
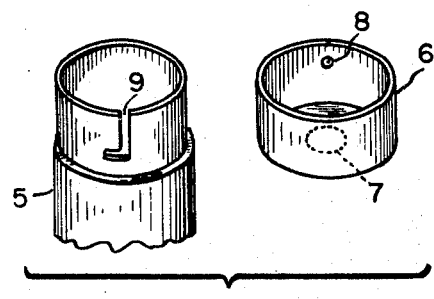
FIGURE 3 is a fragmentary isometric view of the open upper end of the body portion of the receptacle and of the cap portion, the cap portion being shown inverted.

Referring now more particularly to the drawings, there is shown a clinical thermometer designated generally by reference numeral 2 having a bulb 3 at its bottom and an upper end 4 by which it is adapted to be handled. For receiving the thermometer 2 I provide a receptacle comprising an elongated body portion 5 of less length than the thermometer 2 as shown having an open upper end and a closed lower end. The receptacle also comprises a cap portion 6 appliable to the open upper end of the body portion 5 to close such upper end except that the cap portion 6 has therethrough an opening 7 of sufficient size to receive the thermometer 2 so that the thermometer may be introduced and withdrawn through the opening 7 in the cap portion 6 and will have its upper end projecting through the opening 7 and above the top of the cap portion 6 when the thermometer is disposed in the receptacle as shown in FIGURES 1, 2 and 4. The cap portion 6 may be held in place on the body portion 5 of the receptacle by a bayonet slot type of connection created by forming an inward teat 8 on the inner surface of the cap skirt and an L-shaped slot 9 in the upper portion of the upper end of the body portion 5.

When the thermometer is in the receptacle as shown in FIGURES 1, 2 and 4 it may rest on the bottom of the receptacle or on cotton or gauze 13 disposed in the receptacle, the upper end 4 of the thermometer projecting from the receptacle. Thus the portion of the thermometer which enters the patient's mouth is protected or shielded by the receptacle which may contain any suitable disinfectant or antiseptic agent 14.

I provide means for mounting the thermometer receptacle at a convenient place adjacent the bed of the patient who uses the thermometer. It is desirable to mount the receptacle on a generally upright surface such as the side of a table adjacent the patient's bed or an upright portion of the bed itself. I provide a supporting member designated generally by reference numeral 10 adapted to be applied to a generally upright surface to which the receptacle is to be fastened. Such a surface is designated 11 in the drawings. The supporting member 10 may take various forms. In the form shown its back or left hand face viewing FIGURE 4 is covered with adhesive 15 so that the supporting member 10 may simply be adhesively applied to the surface 11. The opposite face of the supporting member or adhesive strip 10 and also the opposed portion of the receptacle have cooperating surface portions which have very small mechanically interlocking elements 12 which interlock when such surface portions are pressed together and separate when such surface portions are pulled apart. One of the cooperating surface portions preferably has very small loops 12a and the other preferably has elements 12b which substantially hook into such loops when the surface portions are pressed together, which loops and elements separate when the surface portions are pulled apart. Such portions may be nylon tapes one covered with a myriad of finely woven monofilaments formed into permanent hooks 12b while the other is covered with soft nylon loops 12a. Pressed together they fasten tightly. The hooks and loops are disengagable by pulling or peeling apart the members carrying them. This type of fastener may be what is known in the trade as a "Velcro" all-nylon tape fastener marketed by Velcro Corporation.

Thus each patient is provided with his own thermometer adapted to be conveniently mounted adjacent the patient's bed, the receptacle protecting the portion of the thermometer which enters the patient's mouth but providing for easy insertion and withdrawal of the thermometer since the upper end of the thermometer projects through an opening at the top of the receptacle which is sized to allow the thermometer to pass through it but to closely embrace the thermometer. Means are provided for firmly mounting the receptacle while at the same time making provision for its removal for cleansing or replacement by another receptacle in the event of change of patients. The work and wastage of time incident to the old system of taking temperatures by a nurse carrying around a tray of thermometers is obviated.

While I have shown and described a present preferred embodiment of the invention it is to be distinctly understood that the invention is not limited thereto but may be otherwise variously embodied within the scope of the following claims.

I claim:

1. A thermometer set comprising a clinical thermometer and a receptacle for the thermometer, the receptacle comprising an elongated body portion of less length than the thermometer having an open upper end and a closed lower end, the receptacle also comprising a cap portion appliable to the open upper end of the body portion to close such upper end except that the cap portion has therethrough an opening of sufficient size to receive the thermometer so that the thermometer may be introduced and withdrawn through the opening in the cap portion and will have its upper end projecting through the opening and above the top of the cap portion when the thermometer is disposed in the receptacle, the body portion of the receptacle having attaching means for securing the receptacle to a generally upright surface, said means being appliable on the surface and removable therefrom for cleansing of the surface.

2. A thermometer set comprising a clinical thermometer, a receptacle for the thermometer adapted to hold the thermometer in generally upright position, said receptacle having adhesive attaching means for securing said receptacle to a generally upright surface, said means being appliable on said surface and removable therefrom for cleansing of the surface.

3. A thermometer set comprising a clinical thermometer, a receptacle for the thermometer adapted to hold the thermometer in generally upright position and an adhesive strip adapted to be applied to a generally upright surface to which the receptacle is to be fastened and removable therefrom for cleansing the surface, the receptacle having a portion through which the receptacle is adapted to be supported, the adhesive strip and said portion of the receptacle having cooperating surface portions one of which has very small loops and the other of which has elements which substantially hook into such loops when such surface portions are pressed together, which loops and elements separate when such surface portions are pulled apart.

References Cited by the Examiner

UNITED STATES PATENTS

| | | | |
|---|---|---|---|
| 990,415 | 4/1911 | Baker | 206—16.6 |
| 1,609,389 | 12/1926 | Tomlinson | 206—16.6 |
| 2,102,690 | 12/1937 | Fischer | 248—205 |
| 2,189,061 | 2/1940 | Faye et al. | 206—16.6 |
| 2,351,107 | 6/1944 | Charnysh | 206—16.5 |
| 2,744,649 | 5/1956 | Smith | 215—100 |
| 2,756,895 | 7/1956 | Enders | 220—18 |
| 2,795,357 | 6/1957 | Burton et al. | 222—173 |
| 3,128,514 | 4/1964 | Parker et al. | 24—11 |
| 3,128,812 | 4/1964 | Scheurer | 150—1.5 |

THERON E. CONDON, *Primary Examiner.*

WILLIAM T. DIXSON, JR., *Examiner.*